United States Patent
Yu

(10) Patent No.: US 9,411,094 B2
(45) Date of Patent: Aug. 9, 2016

(54) BACKLIGHT MODULE AND LIQUID CRYSTAL DISPLAY DEVICE

(71) Applicant: SHENZHEN CHINA STAR OPTOELECTRONICS TECHNOLOGY CO., LTD., Guangdong (CN)

(72) Inventor: Gang Yu, Guangdong (CN)

(73) Assignee: SHENZHEN CHINA STAR OPTOELECTRONICS TECHNOLOGY CO., Guangdong (CN)

( * ) Notice: Subject to any disclaimer, the term of this patent is extended or adjusted under 35 U.S.C. 154(b) by 13 days.

(21) Appl. No.: 14/411,353

(22) PCT Filed: Nov. 12, 2014

(86) PCT No.: PCT/CN2014/090857
§ 371 (c)(1),
(2) Date: Dec. 24, 2014

(87) PCT Pub. No.: WO2016/070443
PCT Pub. Date: May 12, 2016

(65) Prior Publication Data
US 2016/0131824 A1    May 12, 2016

(30) Foreign Application Priority Data
Nov. 7, 2014    (CN) .......................... 2014 1 0625716

(51) Int. Cl.
*G02B 6/42*    (2006.01)
*F21V 8/00*    (2006.01)

(52) U.S. Cl.
CPC ............ *G02B 6/0081* (2013.01); *G02B 6/0091* (2013.01)

(58) Field of Classification Search
CPC .. G02B 6/0073; G02B 6/0081; G02B 6/0091; G02B 6/0093
See application file for complete search history.

(56) References Cited

U.S. PATENT DOCUMENTS

| | | | | |
|---|---|---|---|---|
| 2005/0253980 A1* | 11/2005 | Saito | ................... | G02B 6/0038 349/64 |
| 2012/0287371 A1* | 11/2012 | Oura | ................. | G02F 1/133615 349/60 |
| 2013/0258236 A1* | 10/2013 | Zhang | ................. | G02B 6/0088 349/60 |
| 2013/0265503 A1* | 10/2013 | Hosoki | ............... | G02B 6/0068 348/790 |
| 2013/0300972 A1* | 11/2013 | Wu | ...................... | G02B 6/0095 349/58 |
| 2014/0313773 A1* | 10/2014 | Wu | ...................... | G02B 6/0081 362/612 |

* cited by examiner

*Primary Examiner* — Julie Bannan
(74) *Attorney, Agent, or Firm* — WPAT, P.C., Intellectual Property Attorneys; Anthony King

(57) ABSTRACT

A backlight module is disclosed. The backlight module includes a light guide plate, a light source, a back plate, and a positioning component for maintaining a light coupling distance between the light emitting surface of the light source and the light incident surface of the light guide plate. There is a light coupling distance between the light emitting surface of the light source and the light incident surface of the light guide plate. When a temperature change occurs, the positioning component occurs as a first deformation, as well as the light guide plate occurs as a second deformation. The light coupling distance remains unchanged under the influence of the first deformation and the second deformation. The positioning reliability of the light guide plate is improved in the present invention.

10 Claims, 3 Drawing Sheets

BACKLIGHT MODULE AND LIQUID CRYSTAL DISPLAY DEVICE

BACKGROUND OF THE INVENTION

1. Field of the Invention

The present invention relates to a field of display technology, and more specifically to a backlight module and a liquid crystal display (LCD) device.

2. Description of the Prior Art

Please refer to FIG. 1. A light coupling distance between a light emitting surface of a light source and a light incident surface of a light guide plate 300 is generally maintained by silicon sheets 200 in the design of an existing backlight module. For example, the silicon sheets 200 are disposed between the side of the light guide plate 300 and the side of a back plate 100. In the case which the light coupling distance will remain unchanged, the light guide plate 300 can play a role of stable diffusion to the incident light of the light source, thereby ensuring the brightness of the light guide plate 300.

At high temperatures and room temperature, the light coupling distance between the light emitting surface of the light source and the light incident surface of the light guide plate 300 can remain unchanged due to the expansions of the light guide plate 300 and the silicon sheets 200, thus, the brightness of the light guide plate 300 will not be affected. However, the light coupling distance increases when the contractions of the light guide plate 300 and the silicon sheets 200 occur at low temperatures, thereby reducing the brightness of the light guide plate 300. The above problem is especially serious in single side lighting.

Therefore, there is a need to provide a new technical scheme, so as to overcome the above-mentioned disadvantages.

SUMMARY OF THE INVENTION

An object of the present invention is to provide a backlight module and an LCD device. The present invention is intended to solve the problem of the reduction of the brightness of a light guide plate in the case which a light coupling distance between a light emitting surface of a light source and a light incident surface of the light guide plate being maintained by existing silicon sheets. The reduction is caused by the increase of the light coupling distance. The increase is caused by the contractions of the light guide plate and the silicon sheet occurring at low temperatures.

To overcome the above-mentioned disadvantages, the technical schemes of the present invention are hereunder illustrated.

The present invention provides a backlight module, which includes a light guide plate, a light source, and a back plate for the assemblies of the light guide plate and the light source. The light source is disposed on the first side end of the back plate. There is a light coupling distance between the light emitting surface of the light source and the light incident surface of the light guide plate. The backlight module further includes a positioning component for maintaining the light coupling distance between the light emitting surface of the light source and the light incident surface of the light guide plate. The positioning component is disposed between the second side end of the back plate and the side surface of the light guide plate. The first side end and the second side end are correspondingly defined and opposite each other. The side surface of the light guide plate and the light incident surface of the light guide plate are opposite each other.

The positioning component includes an elastic ring having a through hole therein and an elastic sheet. The elastic sheet includes a closed end and two free ends. The free ends are respectively bent outward to form an opening. The elastic sheet is placed through the through hole of the elastic ring. The closed end is fixed on the second side end of the back plate. The free ends are contacted with the side surface of the light guide plate, respectively. The width of the through hole of the elastic ring and the width of the opening of the elastic sheet can be set based on the actual positioning space of the light guide plate.

When a temperature change occurs, the elastic ring occurs as a first deformation, as well as the light guide plate occurs as a second deformation. The light coupling distance remains unchanged under the influence of the first deformation and the second deformation.

Preferably, the elastic sheet assumes an arch shape.

Preferably, the elastic sheet assumes a herringbone shape.

Preferably, the elastic ring is made of a plastic material, and the elastic sheet is made of an elastic material.

Preferably, the positioning component includes a plastic member, a rotating shaft, and a rigid member. One side of the plastic member is fixed on the second side end of the back plate. The rigid member is rotatably sleeved on the rotating shaft. The fixed end of the rigid member is rigidly connected to the plastic member. The free end of the rigid member is contacted with the side surface of the light guide plate. The rotating shaft is fixed on the back plate.

When a temperature change occurs, the plastic member occurs as a first deformation, as well as the light guide plate occurs as a second deformation. The light coupling distance remains unchanged under the influence of the first deformation and the second deformation.

Preferably, the free end of the rigid member is not contacted with the side surface of the light guide plate when another side of the plastic member is contacted with the side surface of the light guide plate. The free end of the rigid member is contacted with the side surface of the light guide plate when another side of the plastic member is not contacted with the side surface of the light guide plate.

Preferably, the rotating shaft and the back plate are formed as one piece.

Preferably, there is an angle between the fixed end of the rigid member and the free end of the rigid member.

Preferably, the distance between the free end of the rigid member and the rotating shaft is greater than the distance between the rotating shaft and the side surface of the light guide plate.

The present invention further provides a backlight module, which includes a light guide plate, a light source, and a back plate for the assemblies of the light guide plate and the light source. The light source is disposed on the first side end of the back plate. There is a light coupling distance between the light emitting surface of the light source and the light incident surface of the light guide plate. The backlight module further includes a positioning component for maintaining the light coupling distance between the light emitting surface of the light source and the light incident surface of the light guide plate. The positioning component is disposed between the second side end of the back plate and the side surface of the light guide plate. The first side end and the second side end are correspondingly defined and opposite each other. The side surface of the light guide plate and the light incident surface of the light guide plate are opposite each other.

When a temperature change occurs, the positioning component occurs as a first deformation, as well as the light guide plate occurs as a second deformation. The light coupling distance remains unchanged under the influence of the first deformation and the second deformation.

Preferably, the positioning component includes an elastic ring having a through hole therein and an elastic sheet. The elastic sheet includes a closed end and two free ends. The free ends are respectively bent outward to form an opening. The elastic sheet is placed through the through hole of the elastic ring. The closed end is fixed on the second side end of the back plate. The free ends are contacted with the side surface of the light guide plate, respectively.

When a temperature change occurs, the elastic ring occurs as a first deformation, as well as the light guide plate occurs as a second deformation. The light coupling distance remains unchanged under the influence of the first deformation and the second deformation.

Preferably, the elastic sheet assumes an arch shape or a herringbone shape.

Preferably, the elastic ring is made of a plastic material, and the elastic sheet is made of an elastic material.

Preferably, the positioning component includes a plastic member, a rotating shaft, and a rigid member. One side of the plastic member is fixed on the second side end of the back plate. The rigid member is rotatably sleeved on the rotating shaft. The fixed end of the rigid member is rigidly connected to the plastic member. The free end of the rigid member is contacted with the side surface of the light guide plate. The rotating shaft is fixed on the back plate.

When a temperature change occurs, the plastic member occurs as a first deformation, as well as the light guide plate occurs as a second deformation. The light coupling distance remains unchanged under the influence of the first deformation and the second deformation.

Preferably, the free end of the rigid member is not contacted with the side surface of the light guide plate when another side of the plastic member is contacted with the side surface of the light guide plate. The free end of the rigid member is contacted with the side surface of the light guide plate when another side of the plastic member is not contacted with the side surface of the light guide plate.

Preferably, the rotating shaft and the back plate are formed as one piece.

Preferably, there is an angle between the fixed end of the rigid member and the free end of the rigid member.

Preferably, the distance between the free end of the rigid member and the rotating shaft is greater than the distance between the rotating shaft and the side surface of the light guide plate.

The present invention further provides a liquid crystal display device including the above backlight module.

In comparison to the prior art, the form of the elastic structure is changed by combining a plastic structure and an elastic structure as the positioning component as well as by the contraction of the plastic structure in the backlight module and the LCD device of the present invention. When a temperature change occurs, the positioning component occurs as a first deformation, as well as the light guide plate occurs as a second deformation. The light coupling distance remains unchanged under the influence of the first deformation and the second deformation. The present invention is capable of improving the positioning reliability of the light guide plate at low temperatures, and the brightness of the light guide plate is not affected.

The above objectives, and other objectives, features, advantages, and embodiments of the present invention will be better understood from the following description being considered in connection with the accompanied drawings and in which a preferred embodiment of the invention is illustrated by way of example.

DETAILED DESCRIPTION OF THE PREFERRED EMBODIMENTS

The word "embodiment" is used herein to mean serving as an example, instance, or illustration. In addition, the articles "a" and "an" as used in this application and the appended claims should generally be construed to mean "one or more" unless specified otherwise or clear from context to be directed to a singular form.

The embodiment of the present invention provides a backlight module, which includes a light guide plate, a light source, a back plate for the assemblies of the light guide plate and the light source, and a positioning component. The light source is disposed on the first side end of the back plate. There is a light coupling distance between the light emitting surface of the light source and the light incident surface of the light guide plate. The positioning component is used to maintain the light coupling distance between the light emitting surface of the light source and the light incident surface of the light guide plate. The positioning component is disposed between the second side end of the back plate and the side surface of the light guide plate. The first side end and the second side end are correspondingly defined and opposite each other. The side surface of the light guide plate and the light incident surface of the light guide plate are opposite each other.

When a temperature change occurs, the positioning component occurs as a first deformation, as well as the light guide plate occurs as a second deformation. The light coupling distance remains unchanged under the influence of the first deformation and the second deformation. When the positioning component occurs as a deformation by a temperature change, the positioning component is abutted against the side of the light guide plate by the pressure generated by the deformation, so that the light coupling distance remains unchanged.

The technical solution of the present disclosure will be described via the following embodiments.

Embodiment 1

Figure 1:
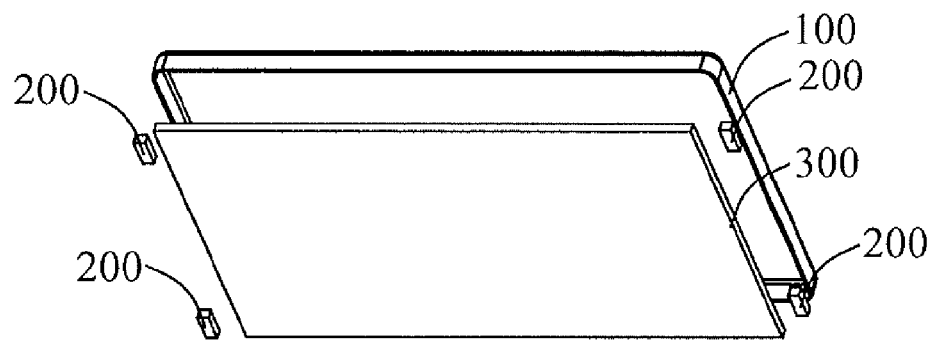
FIG. 1 is a schematic view of a structure of a backlight module in the prior art.
Figure 2:
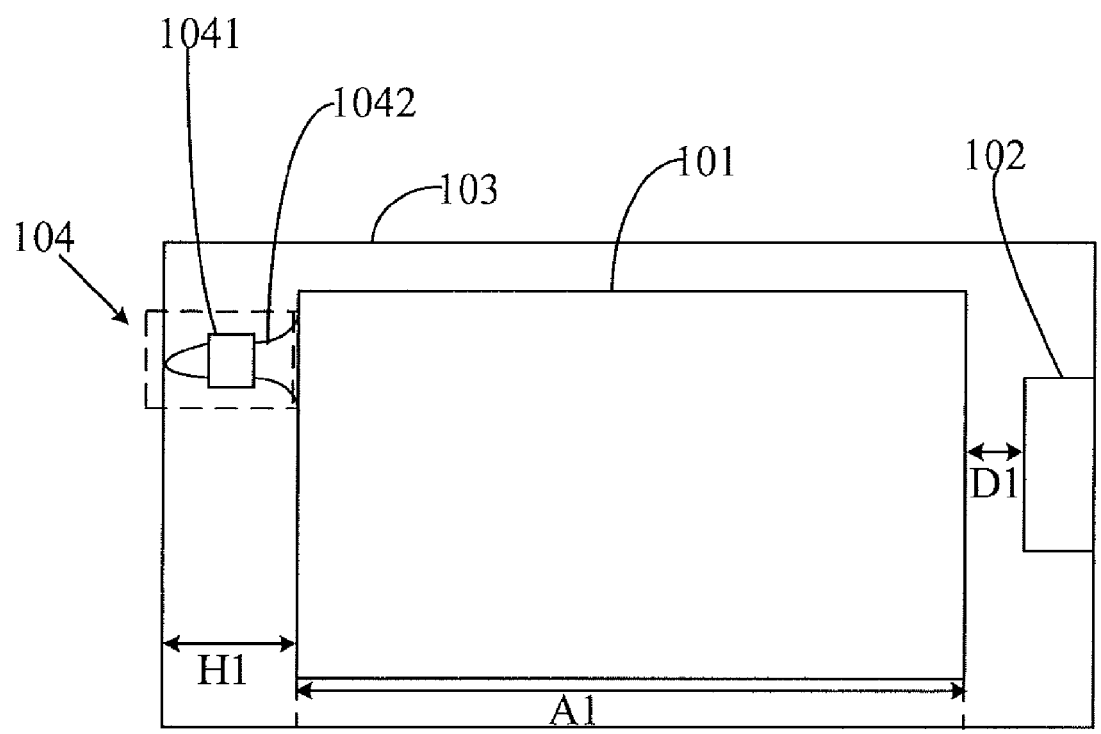
FIG. 2 is a schematic view of a structure of a backlight module according to a first embodiment of the present invention at room temperature.
Figure 3:
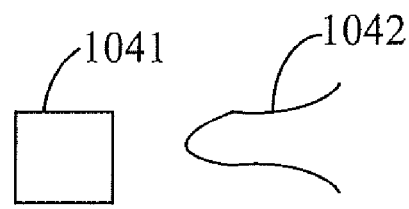
FIG. 3 is an exploded schematic view of a positioning component according to an embodiment of the present invention.
Figure 4:
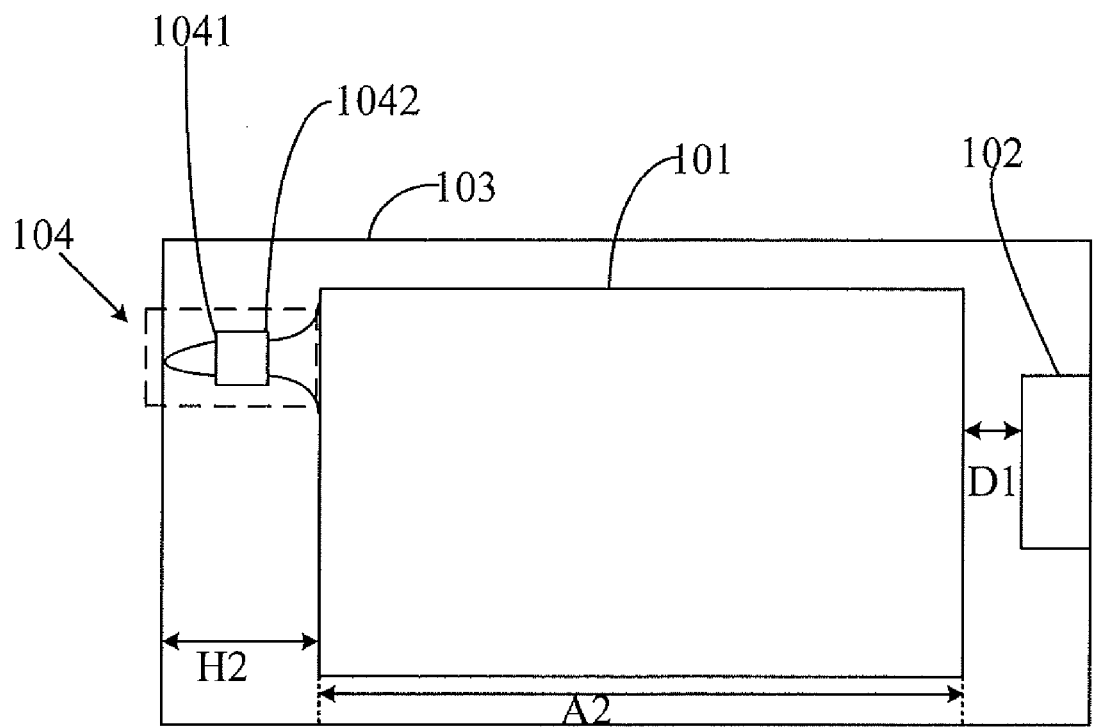
FIG. 4 is a schematic view of a structure of the backlight module according to the first embodiment of the present invention at a low temperature.

Please refer to FIGS. 2 to 4. FIG. 2 is a schematic view of a structure of a backlight module according to a first embodiment of the present invention at room temperature. FIG. 3 is an exploded schematic view of a positioning component according to an embodiment of the present invention. FIG. 4 is a schematic view of a structure of the backlight module according to the first embodiment of the present invention at a low temperature. For illustrative purposes, only the portions related to the embodiment of the present invention are shown.

The backlight module includes a light guide plate 101, a light source 102, a back plate 103 for the assemblies of the light guide plate 101 and the light source 102, and a positioning component 104. The light source 102 is disposed on the first side end of the back plate 103. There is a light coupling distance D1 between the light emitting surface of the light source 102 and the light incident surface of the light guide plate 101. The positioning component 104 is disposed between the second side end of the back plate 103 and the side surface of the light guide plate 101. The first side end and the second side end are correspondingly defined and opposite each other. The side surface of the light guide plate 101 and the light incident surface of the light guide plate 101 are opposite each other. The positioning component 104 is used to maintain the light coupling distance D1 between the light emitting surface of the light source 102 and the light incident surface of the light guide plate 101.

The positioning component 104 includes an elastic ring 1041 having a through hole therein and an elastic sheet 1042. The elastic sheet 1042 includes a closed end and two free ends. The free ends are respectively bent outward to form an opening. The elastic sheet 1042 is placed through the through hole of the elastic ring 1041. The closed end is fixed on the second side end of the back plate 103. The free ends are contacted with the side surface of the light guide plate 101, respectively.

When a temperature change occurs, the elastic ring 1041 occurs as a first deformation, as well as the light guide plate 101 occurs as a second deformation. The light coupling distance D1 remains unchanged under the influence of the first deformation and the second deformation.

However, it can be understood that the elastic sheet 1042 is able to assume an arch shape or a herringbone shape.

As a preferred embodiment of the present invention, the elastic ring 1041 can be made of a plastic material, such as silicone and the like. Therefore, when a temperature change occurs, the elastic ring 1041 made of the plastic material can occur as a deformation based on the temperature change.

As a preferred embodiment of the present invention, the elastic sheet 1042 can be made of an elastic material, such as a plastic material, a metal material, or the like. When a temperature change occurs, the elastic ring 1041 made of the plastic material can occur as a deformation based on the temperature change. At this point, since the elastic ring 1041 is contracted inward to generate a pressure, the elastic sheet 1042 is tightly compressed by the pressure, so that the free ends of the elastic sheet 1042 are contacted with the side surface of the light guide plate 101, respectively; thereby the opening formed by respectively bending outward the free ends of the elastic sheet 1042 is contracted inward, and thus the light coupling distance D1 between the light emitting surface of the light source 102 and the light incident surface of the light guide plate 101 remains unchanged.

As a preferred embodiment of the present invention, the width of the through hole of the elastic ring 1041 and the width of the opening of the elastic sheet 1042 can be set based on the actual positioning space of the light guide plate 101.

The principle of the structure of the backlight module according to the first embodiment of the present invention is hereunder illustrated.

The elastic ring 1041 and the light guide plate 101 cannot occur as a deformation at room temperature. At this point, the distance between the free ends of the elastic sheet 1042 and the elastic ring 1041 is L1, as shown in FIG. 2. Furthermore, the expansions of the elastic ring 1041 and the light guide plate 101 occur when a temperature is raised, but the light coupling distance D1 between the light emitting surface of the light source 102 and the light incident surface of the light guide plate 101 is basically not affected. That is, the light coupling distance D1 between the light emitting surface of the light source 102 and the light incident surface of the light guide plate 101 can remain basically unchanged.

The light guide plate 101 occurs as a second deformation when a temperature is decreased. That is, the length of the light guide plate 101 is changed from A1 to A2 (A2<A1) when the contraction of the light guide plate 101 occurs. In the meantime, the positioning component 104 occurs as a first deformation. That is, since the contraction of the elastic ring 1041 occurs, the through hole of the elastic ring 1041 is contracted inward to generate a pressure, the elastic sheet 1042 is tightly compressed by the pressure, so that the free ends of the elastic sheet 1042 are contacted with the side surface of the light guide plate 101, respectively; thereby the opening formed by respectively bending outward the free ends of the elastic sheet 1042 is contracted inward to generate a force. The light guide plate 101 is pushed and moved in the direction toward the light source 102 by the force. At this point, the distance between the second side end of the back plate 103 and the side surface of the light guide plate 101 is changed from H1 to H2 (H1<H2), as shown in FIG. 4. The light coupling distance D1 between the light emitting surface of the light source 102 and the light incident surface of the light guide plate 101 can remain unchanged if (H2−H1)= (A1−A2).

As mentioned above, in the backlight module according to the first embodiment of the present invention, the opening of the elastic sheet 1042 is contracted inward by the contraction of the elastic ring 1041; thereby the distance between the second side end of the back plate 103 and the side surface of the light guide plate 101 is changed from H1 to H2 (H1<H2), and thus the state of the free ends of the elastic sheet 1042 always cooperating with the light guide plate 101 is achieved. The variance (H2−H1) of the first deformation of the positioning component exactly offsets the variance (A1−A2) of the second deformation of the light guide plate, thereby the light coupling distance D1 remains unchanged, thus avoiding a gap formed by the contraction of the light guide plate 101.

Embodiment 2

Figure 5:
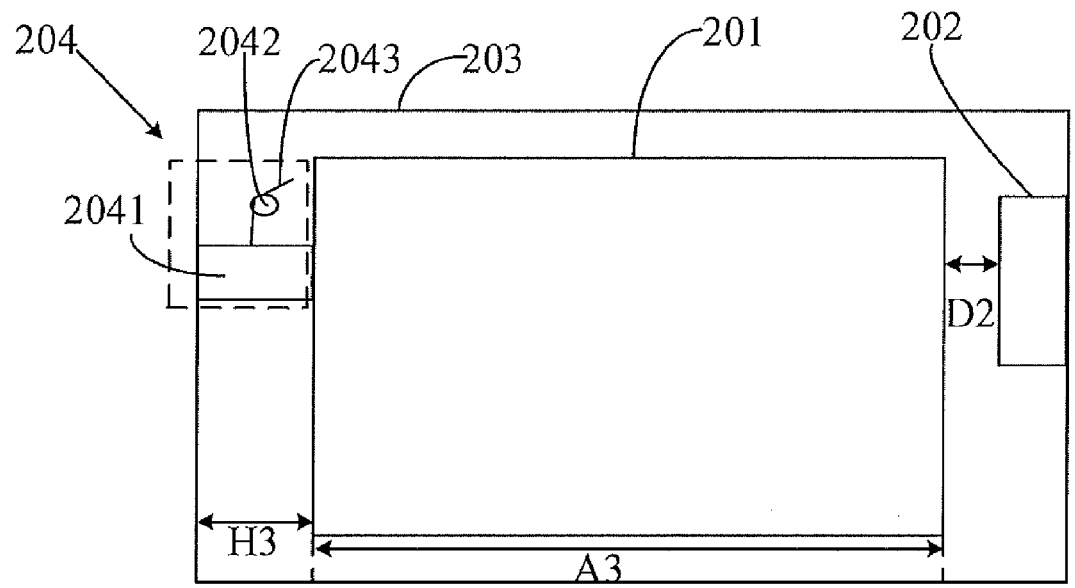
FIG. 5 is a schematic view of a structure of a backlight module according to a second embodiment of the present invention at room temperature.
Figure 6:
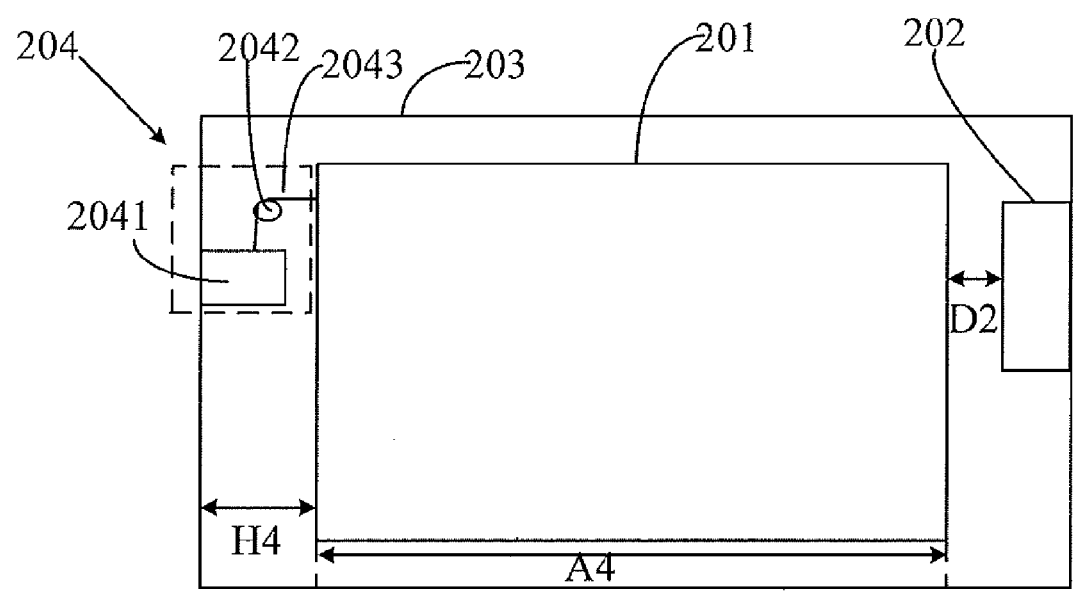
FIG. 6 is a schematic view of a structure of the backlight module according to the second embodiment of the present invention at a low temperature.

Please refer to FIGS. 5 and 6. FIG. 5 is a schematic view of a structure of a backlight module according to a second embodiment of the present invention at room temperature. FIG. 6 is a schematic view of a structure of the backlight module according to the second embodiment of the present invention at a low temperature. For illustrative purposes, only the portions related to the embodiment of the present invention are shown.

The backlight module includes a light guide plate 201, a light source 202, a back plate 203 for the assemblies of the light guide plate 201 and the light source 202, and a positioning component 204. The light source 202 is disposed on the first side end of the back plate 203. There is a light coupling distance D2 between the light emitting surface of the light source 202 and the light incident surface of the light guide plate 201. The positioning component 204 is disposed between the second side end of the back plate 203 and the side surface of the light guide plate 201. The first side end and the second side end are correspondingly defined and opposite each other. The side surface of the light guide plate 201 and the light incident surface of the light guide plate 201 are opposite each other. The positioning component 204 is used to maintain the light coupling distance D2 between the light emitting surface of the light source 202 and the light incident surface of the light guide plate 201.

The positioning component 204 includes a plastic member 2041, a rotating shaft 2042, and a rigid member 2043. One side of the plastic member 2041 is fixed on the second side end of the back plate 203. The rigid member 2043 is rotatably sleeved on the rotating shaft 2042. The fixed end of the rigid member 2043 is rigidly connected to the plastic member 2041. The free end of the rigid member 2043 is contacted with the side surface of the light guide plate 201. There is an angle between the fixed end of the rigid member 2043 and the free end of the rigid member 2043. The rotating shaft 2042 is fixed on the back plate 203.

When a temperature change occurs, the plastic member 2041 occurs as a first deformation, as well as the light guide plate 201 occurs as a second deformation. The light coupling distance D2 remains unchanged under the influence of the first deformation and the second deformation. The free end of the rigid member 2043 is not contacted with the side surface of the light guide plate 201 when another side of the plastic member 2041 is contacted with the side surface of the light guide plate 201. The free end of the rigid member 2043 is contacted with the side surface of the light guide plate 201 when another side of the plastic member 2041 is not contacted with the side surface of the light guide plate 201.

However, it can be understood that the free end of the rigid member 2043 is a free end which is suspended at room temperature.

As a preferred embodiment of the present invention, the plastic member 2041 can be made of a plastic material, such as a silicon sheet and the like. Therefore, when a temperature change occurs, the plastic member 2041 made of the plastic material can occur as a deformation based on the temperature change.

As a preferred embodiment of the present invention, the rigid member 2043 can be made of an elastic material, such as a plastic material, a metal material, or the like. When a temperature change occurs, the plastic member 2041 made of the plastic material can occur as a deformation based on the temperature change. At this point, the rigid member 2043 is rotated by the contraction of the plastic member 2041, so that the free end of the rigid member 2043 is contacted with the side surface of the light guide plate 201 by the rotation, thereby abutting against the light guide plate 201, thus the light coupling distance D2 between the light emitting surface of the light source 202 and the light incident surface of the light guide plate 201 remains unchanged.

As a preferred embodiment of the present invention, the rotating shaft 2042 and the back plate 203 are formed as one piece.

As another preferred embodiment of the present invention, the rotating shaft 2042 can be a rivet.

As another preferred embodiment of the present invention, the distance between the free end of the rigid member 2043 and the rotating shaft 2042 is greater than the distance between the rotating shaft 2042 and the side surface of the light guide plate 201.

The principle of the structure of the backlight module according to the second embodiment of the present invention is hereunder illustrated.

The plastic member 2041 and the light guide plate 201 cannot occur as a deformation at room temperature. At this point, the free end of the rigid member 2043 is suspended (i.e., the free end of the rigid member 2043 is not contacted with the light guide plate 201), the free end of the rigid member 2043 is not perpendicular to the side surface of the light guide plate 101 (angle less than 90 degrees), and another side of the plastic member 2041 is connected with the side surface of the light guide plate 201 at this point, as shown in FIG. 5. Furthermore, the expansions of the plastic member 2041 and the light guide plate 201 occur when a temperature is raised, but the light coupling distance D2 between the light emitting surface of the light source 202 and the light incident surface of the light guide plate 201 is basically not affected. That is, the light coupling distance D2 between the light emitting surface of the light source 202 and the light incident surface of the light guide plate 201 can remain basically unchanged.

The light guide plate 201 occurs as a second deformation when a temperature is decreased. That is, the length of the light guide plate 201 is changed from A3 to A4 (A4<A3) when the contraction of the light guide plate 201 occurs. In the meantime, the positioning component 204 occurs as a first deformation. That is, the plastic member 2041 and the light guide plate 201 are separated to form a gap therebetween since the plastic member 2041 is contracted, but the rigid member 2043 is rotated by the contraction of the plastic member 2041, so that the free end of the rigid member 2043 is contacted with the side of the light guide plate 201 by the rotation, thereby abutting against the light guide plate 201 (i.e., the relationship between the free end of the rigid member 2043 and the light guide plate 201 is changed from contact to noncontact). The light guide plate 101 is pushed and moved in the direction toward the light source 102 by the force generated by the rotation. The distance between the second side end of the back plate 203 and the side surface of the light guide plate 201 is changed from H3 to H4 (H3<H4). The light coupling distance D2 between the light emitting surface of the light source 202 and the light incident surface of the light guide plate 201 can remain unchanged if (H4−H3)=(A3−A4), as shown in FIG. 6.

As mentioned above, in the backlight module according to the second embodiment of the present invention, the rigid member 2043 is rotated by the contraction of the plastic member 2041, so that the free end of the rigid member 2043 is contacted with the side surface of the light guide plate 201 by the rotation (i.e., the relationship between the free end of the rigid member 2043 and the light guide plate 201 is changed from contact to noncontact), thereby abutting against the light guide plate 201. The distance between the second side end of the back plate 203 and the side surface of the light guide plate 201 is changed from H3 to H4 (H3<H4). The variance (H4−H3) of the first deformation of the positioning component exactly offsets the variance (A3−A4) of the second deformation of the light guide plate; thereby the light coupling distance D2 remains unchanged, thus avoiding a gap formed by the contraction of the light guide plate 201.

The embodiment of the present invention further provides a liquid crystal display device. The liquid crystal display device includes the above backlight module. The structure of the backlight module has been described in detail hereinabove, and therefore will not be repeatedly stated herein.

As mentioned above, the form of the elastic structure is changed by combining a plastic structure and an elastic structure as the positioning component as well as by the contraction of the plastic structure in the backlight module and the LCD device of the embodiment of the present invention.

When the temperature change occurs, the positioning component occurs as the first deformation, as well as the light guide plate occurs as the second deformation. The light coupling distance remains unchanged under the influence of the first deformation and the second deformation. The present invention is capable of improving the positioning reliability of the light guide plate at low temperatures, and the brightness of the light guide plate is not affected.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. With particular regard to the various functions performed by the above described components, the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such a feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

It should be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising a light guide plate, a light source, and a back plate for assemblies of the light guide plate and the light source, the light source being disposed on a first side end of the back plate, the light emitting surface of the light source and the light incident surface of the light guide plate having a light coupling distance therebetween, the backlight module further comprising a positioning component for maintaining the light coupling distance between the light emitting surface of the light source and the light incident surface of the light guide plate, the positioning component being disposed between a second side end of the back plate and a side surface of the light guide plate, the first side end and the second side end being correspondingly defined and opposite each other, and the side surface of the light guide plate and the light incident surface of the light guide plate being opposite each other, wherein the positioning component comprises an elastic ring having a through hole therein and an elastic sheet, the elastic sheet comprises a closed end and two free ends, the free ends are respectively bent outward to form an opening, the elastic sheet is placed through the through hole of the elastic ring, the closed end is fixed on the second side end of the back plate, the free ends are contacted with the side surface of the light guide plate, respectively, the width of the through hole of the elastic ring and the width of the opening of the elastic sheet are set based on an actual positioning space of the light guide plate, when a temperature change occurs, the elastic ring occurs as a first deformation, as well as the light guide plate occurs as a second deformation, the light coupling distance remains unchanged under an influence of the first deformation and the second deformation.

2. The backlight module of claim 1, wherein the elastic sheet assumes an arch shape.

3. The backlight module of claim 1, wherein the elastic sheet assumes a herringbone shape.

4. The backlight module of claim 1, wherein the elastic ring is made of a plastic material, and the elastic sheet is made of an elastic material.

5. A backlight module, comprising a light guide plate, a light source, and a back plate for assemblies of the light guide plate and the light source, the light source being disposed on a first side end of the back plate, the light emitting surface of the light source and the light incident surface of the light guide plate having a light coupling distance therebetween, the backlight module further comprising a positioning component for maintaining the light coupling distance between the light emitting surface of the light source and the light incident surface of the light guide plate, the positioning component being disposed between a second side end of the back plate and a side surface of the light guide plate, the first side end and the second side end being correspondingly defined and opposite each other, and the side surface of the light guide plate and the light incident surface of the light guide plate being opposite each other, wherein the positioning component comprises a plastic member, a rotating shaft, and a rigid member, one side of the plastic member is fixed on the second side end of the back plate, the rigid member is rotatably sleeved on the rotating shaft, a fixed end of the rigid member is rigidly connected to the plastic member, a free end of the rigid member is contacted with the side surface of the light guide plate, and the rotating shaft is fixed on the back plate, when a temperature change occurs, the plastic member occurs as a first deformation, as well as the light guide plate occurs as a second deformation, the light coupling distance remains unchanged under an influence of the first deformation and the second deformation.

6. The backlight module of claim 5, wherein the free end of the rigid member is not contacted with the side surface of the light guide plate when another side of the plastic member is contacted with the side surface of the light guide plate; the free end of the rigid member is contacted with the side surface of the light guide plate when another side of the plastic member is not contacted with the side surface of the light guide plate.

7. The backlight module of claim 5, wherein the rotating shaft and the back plate are formed as one piece.

8. The backlight module of claim 5, wherein there is an angle between the fixed end of the rigid member and the free end of the rigid member.

9. The backlight module of claim 5, wherein a distance between the free end of the rigid member and the rotating shaft is greater than a distance between the rotating shaft and the side surface of the light guide plate.

10. A liquid crystal display device, comprising the backlight module of claim 5.

* * * * *